United States Patent Office 3,272,647
Patented Sept. 13, 1966

3,272,647
EPOXY TERMINATED POLYESTER COMPLEXES, COATING COMPOSITIONS CONTAINING SAME AND METAL SUBSTRATES COATED THEREWITH
Ralph G. Swanson and Aloysius N. Walus, Flint, Mich., assignors to E. I. du Pont de Nemours and Company, Wilmington, Del., a corporation of Delaware
No Drawing. Filed Mar. 23, 1962, Ser. No. 182,085
7 Claims. (Cl. 117—75)

This invention relates to new epoxy ester complexes and coating compositions containing same. More particularly, it relates to primers for metal substrates to which acrylic lacquers and alkyd resin coatings will firmly adhere.

Acrylic polymer lacquers, i.e., a liquid coating composition containing a solvent and as the principal film forming component polymers of alkyl methacrylate or alkyl acrylate can be applied to substrates and dried to form surface films having outstanding durability and gloss retention. Unfortunately, such coatings do not adhere firmly to metal substrates and they also lack sufficient rust and corrosion resistant properties when used directly on metal substrates exposed to the weather, such as, automobile bodies. It is, therefore, necessary to apply a protective coating or primer to the metal substrate to achieve the necessary corrosion and rust resistant properties and provide a surface to which the acrylic polymer coatings will adhere.

The corrosion resistant primers now in commercial use are usually based on alkyd resins to which the acrylic lacquers do not adhere too well. To overcome the adhesion problem between the alkyd resin primers and the acrylic lacquers, it has been the practice to apply a sealer or intermediate coat over the corrosion resistant primer to provide a surface to which the acrylic lacquers will firmly adhere.

The primary objective of this invention is the provision of new resinous polymer which when incorporated with other materials provides a metal primer coating having improved corrosion resistance and to which acrylic lacquers will adhere directly, i.e., an intermediate sealer coat is not required. A more specific objective is the provision of a corrosion resistant metal primer coating composition to which various types of topcoating compositions will adhere directly, such as those containing as the principal film forming component alkyd resins, acrylic resins, urea-aldehyde resins, melamine-aldehyde resins and nitrocellulose. A still more specific objective is the provision of finishing systems for automobile bodies, which eliminate the need for an intermediate sealer between the corrosion resistant primer and the durable topcoat.

The primary objective of this invention is accomplished by providing an epoxy terminated polyester (i.e., terminated on each end with an epoxy group) which is the condensation product of two different epoxy resins and polyfunctional fatty acids (i.e., primarily dimer fatty acids) prepared by first reacting (a) one epoxy equivalent of a solid epoxy terminated condensation product of bisphenol propane and epichlorohydrin with (b) two carboxyl equivalents of a polyfunctional fatty acid and subsequently reacting one carboxyl equivalent of said reaction product of (a) and (b) with two epoxy equivalents of (c) a liquid epoxy terminated condensation product of bisphenol and epichlorohydrin.

The commercial polyfunctional (carboxylic) fatty acids useful in this invention are primarily the dimer fatty acids which usually contain a minor proportion of the trimer fatty acid along with an incidental amount of unpolymerized fatty acid. The functional groups referred to are solely carboxyl groups. Proprietary polyfunctional fatty acids which have been found useful include:

|  | Composition, Percent | | |
| --- | --- | --- | --- |
|  | Monomer | Dimer | Trimer |
| Empol 1014 | 1 | 95 | 4 |
| Empol 1022 | 3 | 75 | 22 |
| Empol 1024 | Trace | 75 | 25 |

The more specific objectives of this invention are accomplished by the provision of a metal primer coating composition comprising (1) an epoxy terminated polyester referred to above; (2) a copolymer or terpolymer derived from (a) about 88%–93% of a lower alkyl (1–4 carbon atoms) methacrylate, (b) 0–10% of a lower alkyl (1–4 carbon atoms) acrylate, and (c) 2–7% of either glycidyl acrylate or glycidyl methacrylate; and (3) a crosslinking agent for (1) and (2), such as, a urea-formaldehyde resin, melamine-formaldehyde resin, and preferably benzoguanamine-formaldehyde resin and monohydric alcohol (1–4 carbon atoms) condensates thereof. The lower alkyl radicals referred to above include methyl, ethyl, propyl, isopropyl, butyl and isobutyl.

The epoxy acrylic terpolymers containing more than about 10% of the lower alkyl acrylate and/or less than about 88% of the lower alkyl methacrylate when used in the primer compositions of this invention have poor chip (impact) resistance and poor solvent resistance, i.e., the solvents in the topcoat composition which is applied over the primer attack the primer and cause lifting (blistering). The lower alkyl acrylate can be eliminated entirely from the terpolymer to produce copolymers of lower alkyl methacrylate and glycidyl methacrylate or glycidyl acrylate which can be used in place of the terpolymers in the primer compositions.

The equivalent weight ratios for the epoxy esters are not critical to obtain a reaction product, but are critical to prevent gelling of the polymer solution, i.e., coating compositions. Variations beyond plus or minus 0.1 epoxy or carboxyl equivalent weight of the reactants are to be avoided in the preferred embodiment of this invention.

The still more specific objectives of this invention are accomplished by priming a metal substrate with the primer composition referred to above and then topcoating the primed surface with an acrylic resin topcoat, nitrocellulose lacquer topcoat or a topcoat of a mixture comprising an amino-aldehyde resin and an alkyd resin.

The following examples are given by way of illustration and not limitation wherein the weight and percentage figures are on a weight basis unless stated otherwise.

*Example 1*

An epoxy terminated polyester was prepared in accordance with the following procedure:

The following ingredients were charged, in the manner described below, to a reaction vessel equipped with reflux condenser, thermometers and temperature controls:

|  | By Weight | |
| --- | --- | --- |
|  | Parts | Percent |
| Solid Epoxy Resin | 77.0 | 19.6 |
| Liquid Epoxy Resin | 31.5 | 8.0 |
| Polymerized Fatty Acid | 49.0 | 12.4 |
| Coal Tar Aromatic Solvent B.R. 150–200° C., 7.62 lbs./gal | 157.5 | 40.0 |
| Diacetone Alcohol | 78.7 | 20.0 |
|  | 393.7 | 100.0 |

The following three ingredients were first charged to the reaction vessel in the proportion indicated below:

| | Parts by weight |
|---|---|
| Solid epoxy resin | 77.0 |
| Polymerized fatty acid ("Empol" 1022) | 49.0 |
| Coal tar aromatic solvent, B.R. 150–200° C., 7.62 lbs./gal. | 54.0 |
| | 180.0 |

The solid epoxy resin (commercially available under the code name D.E.R. 664) was the reaction product of epichlorohydrin and bisphenol propane. The particular lot used had an epoxy equivalent weight of 925, softening point of 95–103° C. (Durran's Hg method), refractive index of 1.5971, specific gravity of 1.18.

The polymerized fatty acid ("Empol" 1022) was that resulting from the polymerization of a $C_{18}$ unsaturated monocarboxylic fatty acid to yield a mixture of about 75% dimer, 22% trimer and 3% monomer, the mixture having an average molecular weight of about 600. The particular lot used had a carboxy equivalent of 295. The monomer was an incidental constituent resulting from incomplete polymerization. "Empol" 1022 is described in further detail in "Handbook of Material Trade Names" by Zimmerman and Lavine, Supplement I, pages 73–74, published in 1956 by Industrial Research Service, Dover, N.H. This handbook says that: "Empol" 1022 is a $C_{36}$ dibasic dimer acid produced by the polymerization of unsaturated fatty acids; it has an acid value of 180, a saponification value of 185, a neutralization equivalent of 290–310, a specific gravity at 15.5° C. of 0.95, a flash point of 530° F., a fire point of 600° F., a viscosity at 25° C. of 10,000 centistokes; and it is used in the manufacture of various resins, varnishes and the like. The dimerized acid itself is essentially a 36-carbon dicarboxylic acid obtained by dimerization of soya, cottonseed, corn and linseed oils of commerce. The product is frequently referred to as dilinoleic acid. This dimerized acid product may be purchased under the name "Empol" 1022. These dimers are disclosed in U.S. Patent 3,093,609.

The three ingredients listed in the above formula were heated with agitation to 165–170° C. and held at that temperature until an acid number of 37–39 was reached, after which 31.5 parts by weight of a liquid epoxy resin were added to the reaction mixture with rapid agitation.

The liquid epoxy resin (commercially available under the code name D.E.R. 331) was the reaction product of epichlorohydrin and bisphenol propane. The lot used had an epoxy equivalent weight of 190, viscosity of 11,000–16,000 centipoises and a specific gravity of 1.17.

Following the addition of all the liquid epoxy resin, an additional amount of 36 parts of the coal tar aromatic solvent is added rapidly with agitation and the temperature of the reactants was raised to 165–170° C. and held at this temperature until the reaction product has an acid number less than about 2, after which the heat is shut off and an additional quantity of 67.5 parts of the aromatic solvent is added with agitation to cool the reaction mixture. To adjust the concentration of the solution to about 40% non-volatile 78.7 parts of diacetone alcohol are added to the reaction mixture and the mixture thoroughly mixed.

The finished product from the reaction kettle is an epoxy terminated polyester having an acid number less than about 2.0, a viscosity between X and $Z_2$ on the Gardner-Holdt scale and a non-volatile content of 40.0%. The product is useful as a major component in a primer for a metal substrate to be finished with an acrylic lacquer as described in Example 2.

*Example 2*

The following ingredients are thoroughly mixed to prepare a primer composition for application to a metal substrate:

| | Parts by Weight | |
|---|---|---|
| | Preferred Formula | Useful Range |
| 40% Solution Epoxy Terminated Polyester prepared in accordance with Example 1. | 29.49 | 23.0 to 31.0. |
| Epoxy Acrylic Terpolymer (Described below). | 25.86 | 24.0 to 33.0. |
| Benzoguanamine/Formaldehyde Resin | 1.64 | 0.1 to 2.6. |
| Diphenyl Guanidine | .21 | 0 to 1.0. |
| Soya Lecithin | .31 | 0 to 5.0. |
| Diacetone Alcohol | 2.07 | 1 to 26.0. |
| Coal Tar Aromatic Solvent (B.R. 150–200° C.). | 23.90 | 0 to 25.0. |
| Aluminum Silicate | 14.08 | 7 to 28.0. |
| Carbon Black | 2.44 | 0 to 5.0. |
| | 100.00 | |

The above composition has the following properties:

| | | |
|---|---|---|
| Weight per gallon | pounds | 9.00 |
| Viscosity, #15 cup | seconds | 10–18 |
| Total non-volatile by wt. | percent | 38.9 |
| Total non-volatile by volume | do | 27.8 |
| Pigment volume | do | 26.3 |
| Pigment/film former ratio | | 74/100 |

The primary function of the epoxy terminated polyester is to promote and enhance the adhesion of the primer composition to a metal substrate and to provide a surface to which alkyd resin finish coats will readily and strongly adhere.

The epoxy acrylic terpolymer containing 92.5% methyl methacrylate, 2.5% ethyl acrylate and 5.0% glycidyl methacrylate is prepared by charging the following ingredients into an autoclave and then heating under autogenous pressure at about 240° F. until 100% conversion of the acrylic monomers to the terpolymer was achieved.

| | Parts by weight |
|---|---|
| Methyl methacrylate | 273.0 |
| Ethyl acrylate | 7.4 |
| Glycidyl methacrylate | 14.8 |
| Coal tar aromatic solvent (B.R. 150–200° C.) | 420.1 |
| Methyl ethyl ketone | 86.1 |
| Diethylene glycol monobutyl ether | 59.4 |
| Diacetone alcohol | 66.4 |
| Tertiary butyl perbenzoate | 3.0 |
| Benzoyl peroxide | 0.9 |
| | 931.1 |

The primary function of the acrylic terpolymer is to provide a primed surface to which acrylic lacquer finish coats will readily adhere.

The benzoguanamine/formaldehyde resin serves as a cross-linking agent between the epoxy terminated polyester and the epoxy terpolymer during the curing of the primer composition to render the dry primer solvent resistant.

The diphenyl guanidine reinforces the cross-linking action and while preferred, it can be eliminated entirely where the maximum cross-linking or insolubility is not desired.

The soya lecithin is present in the preferred formula to prevent settling of the composition during storage and is not essential in carrying out this invention.

The aluminum silicate is a filler which can be replaced with other well known fillers, such as calcium carbonate, barium sulfate, etc. The aluminum silicate is preferred to give the best balance between blister resistance and cost.

The pigment and solvents are not particularly critical and many others well known to those skilled in the art can be used.

The epoxy acrylic polymer in the preferred primer composition of this invention can be prepared from other lower alkyl methacrylates and other lower alkyl acrylates in which the alkyl substituent on either or both the acrylic and methacrylic moiety can be methyl, ethyl, propyl, butyl, isopropyl or isobutyl. The acrylic terpolymer can be replaced with copolymers of glycidyl methacrylate and alkyl(1,4c)methacrylates. The glycidyl methacrylate in the preferred primer composition can also be replaced with glycidyl acrylate.

The primer compositions of this invention can be applied to cleaned and phosphate treated metal substrates by spraying, dipping or flow coating. The primer compositions are particularly well suited for dip coating and for this type of application, the viscosity of the primer is first reduced to a level, called dipping viscosity (usually within 25 to 45 seconds measured at 25° C. in #2 Fisher cup), which gives optimum appearance and dry film thickness on the sheet metal part to be dip coated. This reduction to dipping viscosity is done with a blend of aromatic hydrocarbon and oxygenated solvents, such as, Solvesso 100, and diacetone alcohol in about 1 to 1 volume ratio. To 100 parts by volume of primer prepared in Example 2, 40–60 parts by volume of the solvent blend are added with continuous agitation, to yield the dipping viscosity. Into this mixture is dipped the previously cleaned and preferably phosphate treated metal part. The part is withdrawn at a slow uniform rate of about 10 feet/minute, a rate similar to that used in commercial practice. Slower or faster withdrawal rate will result in a dry film thickness which will be more uniform from top to bottom on the part or less uniform, respectively.

Following withdrawal, the part is allowed to drain in a chamber free of drafts until its dripping has substantially stopped (about 7–10 minutes) and then the part is placed in a 390° F. oven for a 30 minute bake. A 4" x 36" steel panel of 20 gauge stock dip coated drained and baked in this manner will have a dry film thickness of about 0.3, 0.5, 0.7 and 0.8 mil measured 2, 12, 24 and 35 inches from the top of the panel. The 0.5 mil film will have a hardness of about 25 Knoop units measured on a Tukon tester and a gloss of about 60 ASTM units measured at 60° reflectance. This panel, or a similarly prime coated part, is now spray coated directly with an automotive acrylic lacquer, such as described in Example 10 of U.S. Patent 2,934,509, to yield about 2–3 mils of dry lacquer thickness after a 30 minute bake at 225° F.

Also, a similarly primed part can be spray coated with an automotive nitrocellulose lacquer or an alkyd resin/nitrogen resin enamel to yield about 1.5–2.0 mils of dry coating thickness after a 30 minute bake at a temperature appropriate for the particular coating.

The corrosion resistance of the metal primed with the sealerless primer (Example 2) was evaluated along with that of a commercial alkyd primer without topcoat. Each primer was similarly dip applied to five replicate 4" at 12" steel Bonderite #100 panels baked 30' at 390° F. in the case of the sealerless primer of this invention (Example 2) and 30' at 375° F. in the case of the commercial alkyd primer. Film thickness measured at 2" and 10" from the top of the panels is .18 and .32 mil respectively, in the case of the sealerless primer and .21 and 0.32 mil, respectively, in the case of the alkyd primer. The 10 panels were placed in an ASTM salt spray cabinet which supplies a 5% NaCl fog at 95° F. After 120 hours in this cabinet, the panels showed the following amount of corrosion, measured as the percent of panel area corroded:

| Panel | Percent Panel Area Corroded | |
|---|---|---|
| | Sealerless Primer (Example 2) | Commercial Alkyd Primer (Control) |
| 1 | 5 | 70 |
| 2 | 5 | 70 |
| 3 | 10 | 60 |
| 4 | 5 | 60 |
| 5 | 15 | 70 |

Similar unsealed systems on zinc phosphate ("Bonderite" 100) coated 4" x 12" steel panels show the following performance of the primer composition of this invention (Example 2) relative to that of the commercial automotive sealer coat, and typical acrylic lacquer topcoats or consisting of the same alkyd primer and typical alkyd-nitrogen resin nitrocellulose lacquer topcoats. Adhesion is measured as chip resistance which was determined with a gravelometer (described below). The results were as follows:

| Primer | Sealer Coat Applied Over Primer | Topcoat (Surface Finish) | Gravelometer Chip Resistance [1] | |
|---|---|---|---|---|
| | | | Initial | After 3 Mos. Outdoor Exposure In Florida |
| Example 2 | None | Commercial Acrylic Lacquer.[2] | 8 | 8.5 |
| Do | do | Commercial Baked Amino-Aldehyde Resin/Alkyd Resin Enamel.[3] | 8.0 | 8.0+ |
| Do | do | Commercial Nitrocellulose Lacquer. | 9.0 | 8.0 |
| Commercial Alkyd Resin [4] | Commercial Sealer [5] | Commercial Acrylic Lacquer.[2] | 2 | 2 |
| Commercial Alkyd Primer [4] | None | Commercial Baked Amino-Aldehyde Resin/Alkyd Resin Enamel.[3] | 4.5 | 4.5 |
| Do.[4] | do | Commercial Nitrocellulose Lacquer. | 6 | 6.5 |

[1] The gravelometer chip resistance rating ranges from 0 to 10 with 0 being very poor and 10 excellent.
[2] U.S. Patent 2,934,509, Example 10. Based on polymethyl methacrylate.
[3] U.S. Patent 2,823,140, Primer C, Column 6, lines 11–17.
[4] Pigmented Soya Oil Modified Glyceryl Phthalate Alkyd Resin.
[5] U.S. Patent 2,823,140, Column 4, lines 65–75.

The Gravelometer is described as follows:

This instrument is a special type of impact tester which is designed to simulate on a 4" x 12" painted test panel the kind of paint chipping observed on the leading surfaces of automobiles that is caused by flying gravel. The principle of the gravelometer is to use controlled air pressure in propelling a measured quantity of gravel or grit against a test panel which is coated with the finishing system to be tested. The resulting pattern of chipping is then rated for degree of severity by matching it against a similar one in a standard set of patterns of uniformly graded severity. The standard set is graded in units from 0 to 10 with 0 as very poor chip resistance and 10 as excellent chip resistance.

In practice, 500 grams of grit ("Alundum" Bumblex-A grit, size 6) is dropped into an air stream contained in a 1" pipe at 20 lbs./sq. in. gage pressure supplied by a ½ inch pipe at about 90 lbs./sq. in. pressure. A test panel is rigidly held in the air stream at a distance of 10 inches from the exit of the 1″ pipe. The resulting chip pattern on the test panel is matched against photographs of the standard chip panels.

We claim:

1. The process of preparing an epoxy terminated polyester comprising:
    (a) reacting one epoxy equivalent weight of a solid epoxy resin which is the reaction product of epichlorohydrin and bisphenol propane and two carboxyl equivalent weights of polymerized fatty acid to provide a carboxyl terminated prepolymer,
    (b) reacting one carboxyl equivalent weight of said prepolymer with two epoxy equivalent weights of a liquid epoxy resin which is the reaction product of epichlorohydrin and bisphenol propane to provide an epoxy terminated polyester.

2. The product of the process of claim 1.

3. The process of claim 1 in which the polymerized fatty acid is a mixture of dimer and trimer fatty acids.

4. A product of the process of claim 3.

5. A coating composition comprising:
    (a) an epoxy acrylic polymer derived from about 88–93% of a lower alkyl methacrylate, up to 10% of a lower alkyl acrylate, and 2–7% of a material selected from the class consisting of glycidyl methacrylate and glycidyl acrylate,
    (b) an epoxy terminated polyester defined in claim 4, and
    (c) a cross-linking agent for (a) and (b).

6. The product of claim 5 in which the cross-linking agent is selected from the class consisting of
    (a) urea-formaldehyde resins,
    (b) melamine-formaldehyde resins,
    (c) benzoguanamine-formaldehyde resins, and
    (d) 1–4 carbon atom monohydric alcohol condensates of said resins.

7. A metal substrate primed with the composition of claim 5 and surface coated with a composition containing as the essential film former a material selected from the class consisting of
    (a) polymethyl methacrylate,
    (b) mixture of soya oil modified glyceryl phthalate resin and butylated urea-formaldehyde resin, and
    (c) nitrocellulose.

References Cited by the Examiner

UNITED STATES PATENTS

| | | | |
|---|---|---|---|
| 2,934,509 | 4/1960 | Crissey et al. | 260—30.6 |
| 2,970,231 | 1/1961 | Rogers et al. | 260—18 |
| 2,970,983 | 2/1961 | Newey | 260—78.4 XR |
| 2,992,132 | 7/1961 | Melamed | 117—75 |
| 3,052,659 | 9/1962 | Woodruff | 260—834 XR |
| 3,058,947 | 10/1962 | Fryling et al. | 260—834 XR |
| 3,069,291 | 12/1962 | Levine et al. | 117—75 |

FOREIGN PATENTS 691,543  5/1953  Great Britain.

OTHER REFERENCES

Paint, Oil and Chemical Review, November 9, 1950, page 15.

Skeist: "Epoxy Resins," Reinhold Publishing Corporation, New York, 1958, 293 pages, page 247 relied upon.

LEON J. BERCOVITZ, *Primary Examiner.*

DONALD E. CZAJA, C. W. IVY, R. W. GRIFFIN,
*Assistant Examiners.*